UNITED STATES PATENT OFFICE.

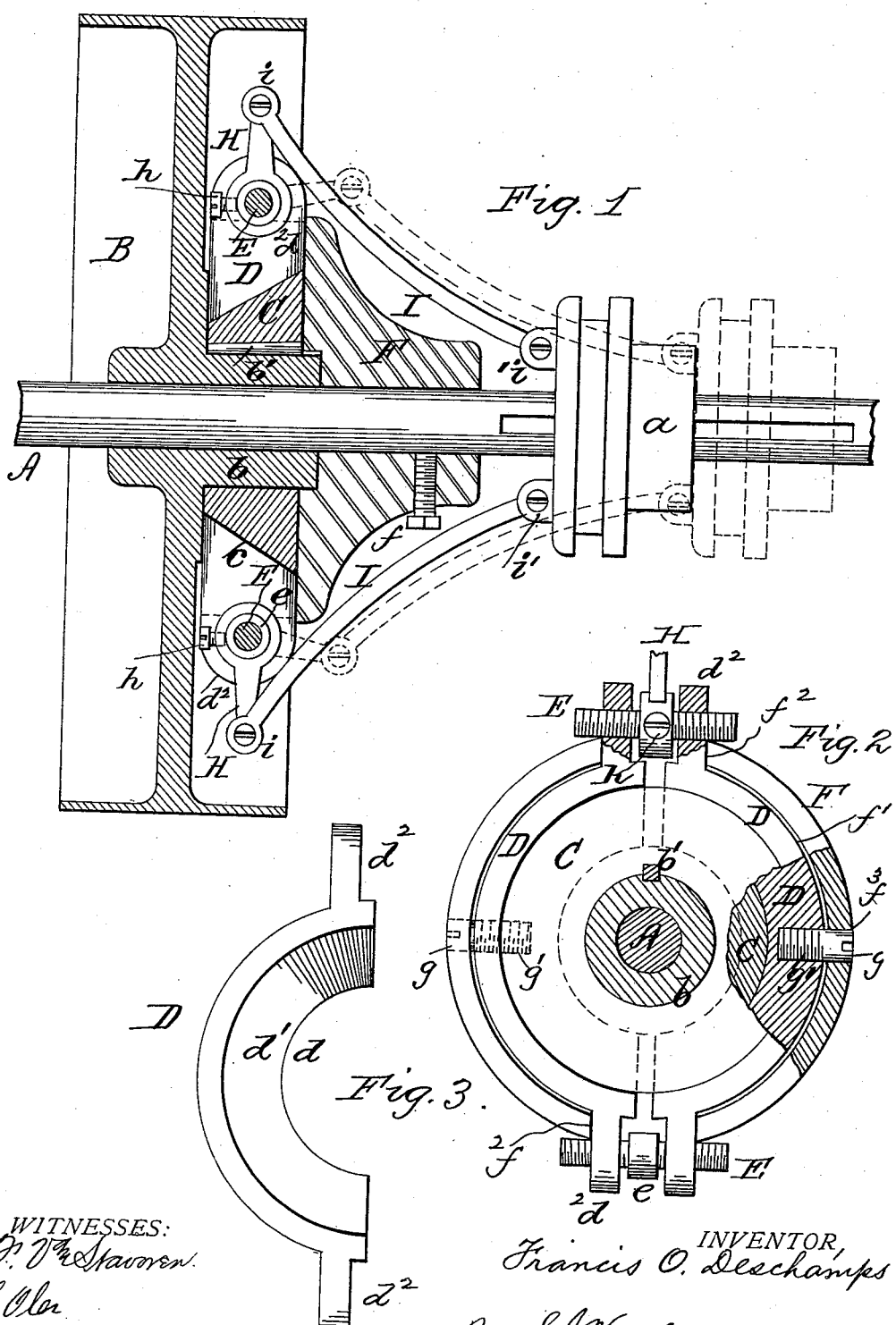

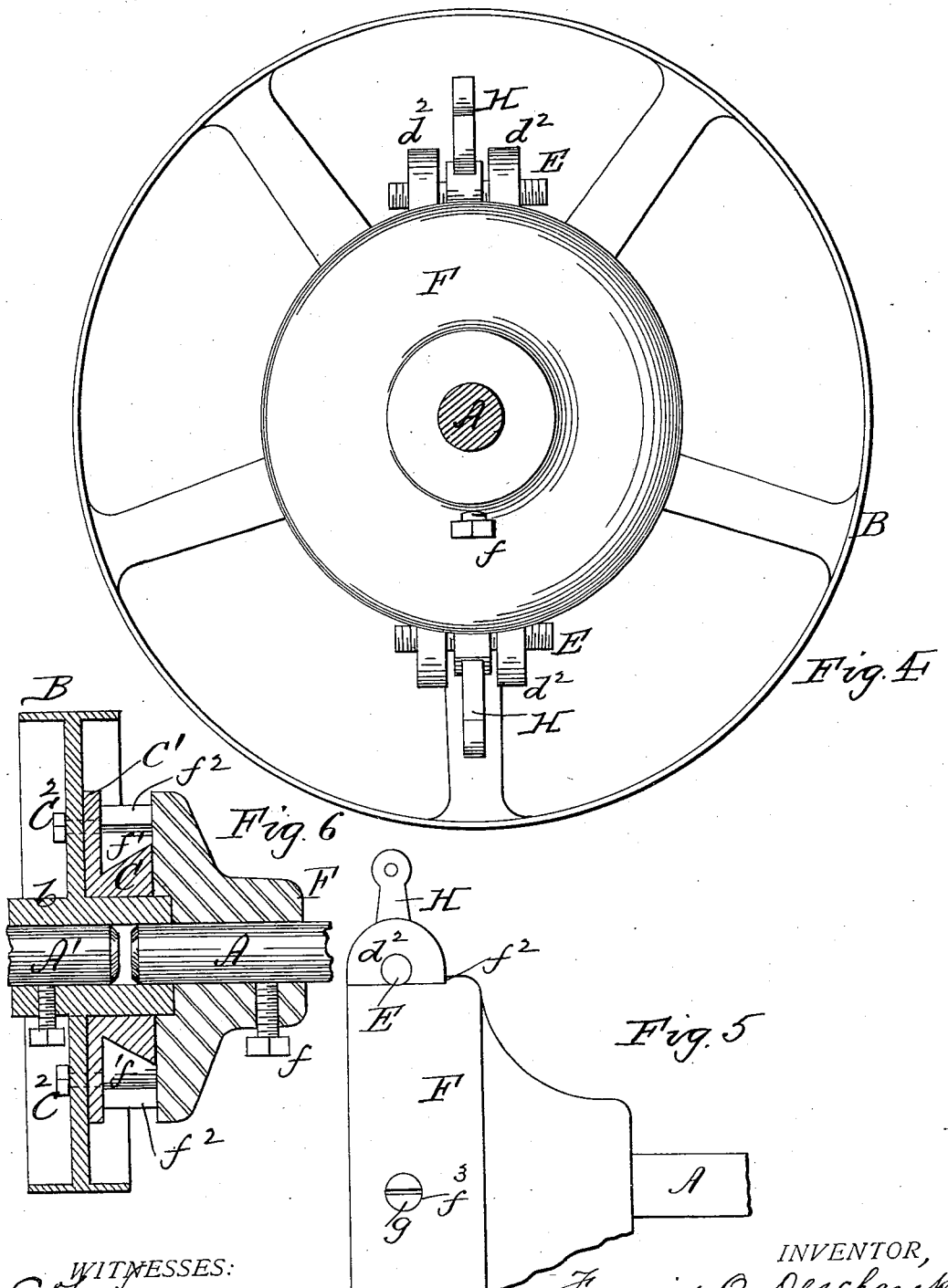

FRANCIS O. DESCHAMPS, OF PHILADELPHIA, PENNSYLVANIA.

FRICTION-CLUTCH.

SPECIFICATION forming part of Letters Patent No. 266,275, dated October 24, 1882.

Application filed February 27, 1882. (No model.)

*To all whom it may concern:*

Be it known that I, FRANCIS O. DESCHAMPS, a citizen of the United States, resident of the city and county of Philadelphia, in the State of Pennsylvania, have invented certain new and useful Improvements in Friction-Clutches, of which the following is a specification, reference being had to the accompanying drawings, wherein—

Figure 1 is a longitudinal vertical section of loose pulley-and-clutch mechanism embodying my improvement. Fig. 2 is a face view of the clutch mechanism, partly in section. Fig. 3 is an elevation of one of the clutching-shoes. Fig. 4 is an elevation of my improvements. Fig. 5 is a detail elevation, and Fig. 6 is a vertical section of modification.

My invention has relation to friction-clutches, and has for its object to provide a simple and inexpensive clutch of great power.

My invention accordingly consists of the novel combination, construction, and arrangement of parts, as hereinafter more specifically described and claimed.

Referring to the accompanying drawings, A represents a shaft having the usual sliding collar or sleeve, $a$, and upon which is placed the loose pulley B. To the hub $b$ of the pulley is secured a collar, C, either by a key, $b'$, or by any other suitable means. Said collar is beveled on its outside edge or periphery, as shown at $c$, so as to form a frustum of a cone, the smallest diameter or base of which is placed next to the spokes of pulley B.

D D represent the clutching-shoes, each of which is of the form shown in Fig. 3, with semicircular portion $d$, beveled inner side, $d'$, and lugs $d^2 d^2$. The latter are diametrically opposite each other, and are placed on the exterior periphery of said shoes. Said lugs are provided with threaded openings, into which pass screws E E. The latter are formed with a central unthreaded enlarged part, $e$, and right-and-left-hand threads on either side thereof, so that when said screws are rotated in one direction the shoes D D approach each other, and when turned reversely said shoes recede from one another. Hence when said shoes are placed in position upon collar C, with their beveled sides $d' d'$ resting upon and in impingement with bevel-periphery $c$ of said collar, and the screws E E rotated or turned in the proper direction, said shoes approach each other and come into clutch engagement with collar C. Upon turning said screws in a reverse direction the shoes recede from each other, thereby releasing such clutch engagement.

F represents the carrier, screwed or otherwise fastened to shaft A, as shown at $f$, and is formed with a chamber, $f'$, for the reception of shoes D D. The wall or periphery of said chamber is slotted, as shown at $f^2 f^2$, for the lugs $d^2 d^2$ of the shoes to pass into, as plainly illustrated in Figs. 3 and 5.

$g\ g$ are pins passing through openings $f^3 f^3$ in carrier F, and are screwed at $g' g'$ in shoes D D, as indicated in Fig. 2. Hence when the carrier is rotated said pins cause the shoes D D to revolve therewith, and are so provided to relieve the lugs $d^2 d^2$ of the strain to which they would otherwise be subjected if said pins were not employed. The unthreaded parts $g^2 g^2$ of said pins, working or moving in openings $f^3 f^3$ of carrier, permit the shoes moving to and from each other.

H H are arms or levers secured to enlarged parts or collars $e\ e$ of screws E E by set-screws $h\ h$. The opposite ends of said levers are pivoted at $i\ i$ to bars I I, which in turn are pivoted at $i'\ i'$ to sliding sleeve $a$, as shown in Fig. 1. Hence when sleeve $a$ is moved toward pulley B the levers H H are moved into a more or less vertical position, thereby turning the screws E E, and causing the shoes D D to approach each other and clutch upon the collar C, so that when shaft A is driven the pulley B revolves therewith. Such position is shown in full lines in Fig. 1. When sleeve $a$, arms or bars I I, and levers H H are caused to assume the position indicated by dotted lines in said figure the screws E E are reversely turned, thereby causing the shoes D D to move away from each other and release such clutch engagement. As the shoes D D wear the levers H H are adjusted or caused to assume different angles of inclination in relation to screws E E, and thereby take up such wear.

I have shown and described the collar C as being separate from and secured to hub $b$ of pulley B; but such collar may be formed integral with said hub. Such mode of construction I deem to be the preferable one; but in applying my improved clutch mechanism to pulleys already in use the collar C is then made separate from and secured to such pulleys, as described.

It is evident that the above-described clutch possesses great clutching-power, the bevel on collar C affording a relatively larger area for contact-surface with the shoes than if said collar were formed cylindrical in outline.

It will be noticed that the shoes D D are locked upon and unlocked from collar or disk C by a positive motion through the medium of screws E, levers H, bars I, and sleeve $a$, so that if said shoes are locked upon disk C to such extent that they tend to stick or adhere thereto they are readily unlocked by said means. In other words, the same power exerted to lock the shoes upon disk C is employed to effect their disengagement therefrom; whereas in clutches heretofore constructed the clutching-shoes are unlocked by different mechanism than that used to effect the clutch engagement thereof, a spring or other similar device being heretofore employed to effect such disengagement.

In Fig. 6 I have shown my improvements applied as a shaft-coupler, wherein the pulley B is represented as secured to shaft A' or the driven shaft. The carrier F is secured to a separate shaft, A, designed to act as a driving-shaft, or vice versa, as desired. The disk C is provided with a flange, C', and bolted at $C^2 C^2$ to the spokes of pulley B. In this figure the clutch-shoes are not represented, being left off thereof in order to more plainly show the construction of said carrier F.

What I claim as my invention is—

1. In a friction-clutch, the combination of a sliding sleeve, a carrier, semicircular shoes formed with beveled sides $d'$ and lugs $d^2$, having right-and-left-hand screws, to which are secured levers, and mechanism interposed between said levers and sleeves, substantially as shown and described.

2. The combination, with a loose pulley upon the driven shaft and a collar for said pulley, having a beveled periphery, with the smallest diameter toward the spokes of the pulley, of clutch-shoes formed with lugs, into which are passed right-and-left-hand screws carrying levers or arms, a carrier for said shoes, rigidly secured to driven shaft, a sliding sleeve thereon, and mechanism interposed between the latter and said levers or arms, substantially as shown and described.

3. The combination, with pulley B, having a beveled collar, C, secured to or formed on said pulley, of beveled clutching-shoes provided with lugs carrying right-and-left-threaded screws with levers attached thereto, a carrier therefor, and means, substantially as described, whereby when said screws are rotated in one direction said shoes approach each other, and recede from one another when said screws are reversely turned, substantially as set forth.

4. The shoes D, having beveled sides $d'$ and lugs $d^2$, designed and adapted to be connected together by right-and-left-hand screws, substantially as and for the purpose set forth.

5. The combination of carrier F, shoes D D, pins $g\,g$, and screws E E, constructed substantially as shown and described.

6. In combination with a loose pulley having a beveled collar formed on or secured thereto, correspondingly-shaped friction or clutching shoes, provided with right-and-left-hand screws carrying operating levers, and means for altering the angle of inclination of said levers in relation to said screws, substantially as shown and described.

7. The combination, in a friction-clutch, of a pulley or shaft provided with a beveled collar, clutching-shoes formed with correspondingly-beveled sides to engage with said collar, said shoes having lugged ends which carry right-and-left-threaded screws, and mechanism interposed between said screws, and a sliding collar or sleeve designed to move upon the shaft to which said parts are attached, substantially as and for the purpose set forth.

In testimony that I claim the foregoing I have hereunto set my hand this 22d day of February, A. D. 1882.

FRANCIS O. DESCHAMPS.

Witnesses:
CHAS. F. VAN HORN,
S. J. VAN STAVOREN.